Oct. 3, 1950 W. H. BRATTAIN ET AL 2,524,034

THREE-ELECTRODE CIRCUIT ELEMENT UTILIZING SEMICONDUCTOR MATERIALS

Filed Feb. 26, 1948

INVENTORS: W. H. BRATTAIN
R. B. GIBNEY

BY Harry C. Hart

ATTORNEY

Patented Oct. 3, 1950 2,524,034

UNITED STATES PATENT OFFICE 2,524,034

THREE-ELECTRODE CIRCUIT ELEMENT UTILIZING SEMICONDUCTOR MATERIALS

Walter H. Brattain and Robert B. Gibney, Morristown, N. J., assignors to Bell Telephone Laboratories, Incorporated, New York, N. Y., a corporation of New York Application February 26, 1948, Serial No. 11,168

14 Claims. (Cl. 179—171)

This invention relates to electric circuit elements utilizing semiconductor materials.

The principal object of the invention is to provide high amplification of small electric signals.

Related objects are to provide amplification with simple, compact and inexpensive apparatus, without resort to evacuated or gas-filled envelopes, with no requirement of heated thermionic cathodes, and to provide it substantially instantaneously when the apparatus is first turned on.

It has heretofore been proposed to alter the resistance of a strip or film of semiconductive material under control of a signal to be amplified. The strip forms a part of a work circuit, and the proposal is that as a result of the signal-controlled resistance alteration the current in this work circuit is altered. If these current alterations exceed the current required to exert the control, amplification will be obtained.

The control is exerted by the application of an electric field to the surface of the semiconductor film or strip. If the strength of the electric field at the surface of the semiconductor is sufficient, it will overpower surface charges at the surface of the semiconductor and reach past them to modify the density of mobile charges in the interior, and therefore the conductivity of the strip as a whole. In the past this field has been applied by way of a film or layer of dielectric material which is interposed between the semiconductor strip and a metal plate which serves as a control electrode and to which the signal to be amplified is applied. Two difficulties arise in the attempt to carry out these teachings. First, most dielectric materials break down before the necessary high values of field strength are reached. Second, even in the case of materials of sufficient dielectric strength, the required field strength can be secured only by the use of films of a thinness which it is extremely difficult to apply with sufficient uniformity or, with films of practical thicknesses, by the application of voltages of inconveniently large magnitudes.

Past efforts to construct amplifiers in the foregoing manner have proceeded on the natural assumption that the layer of insulation between the semiconductor strip and the control electrode was an essential element. This assumption was natural because of the well-known fact that when two metallic conductors are placed in mutual contact, any potential difference which may have existed between them is at once equalized.

The present invention is based on the realization that the layer of insulation is, in fact, unnecessary: that by placing an electrolyte in close physical contact with the semiconductor strip, an electric field of great strength may be applied to the latter, which easily overpowers the surface charges and reaches in to the interior of the semiconductor to modify its conductivity; and that by holding the control voltages to values which are below the ionic discharge potential for the electrolyte employed, the only current which flows across the interface between the electrolyte and the semiconductor is of very small magnitude, so that the control voltage is maintained.

In accordance with the invention, therefore, a strip or film of semiconductor material is provided, which forms a part of a circuit in which the current is to be modified. An electrolyte, preferably one which does not react chemically with the semi-conductor material, is placed directly in contact with it, and a control signal is applied to the electrolyte, by way of an electrode of inert material in contact with it or embedded in it, or otherwise. When a small signal is applied to the latter, the current in a load connected in circuit with the strip changes. The amount of this change exceeds the current drawn by the control electrode, and amplification is obtained.

The invention will be fully apprehended from the following detailed description of preferred embodiments thereof taken in connection with the appended drawings in which.

Figure 1:
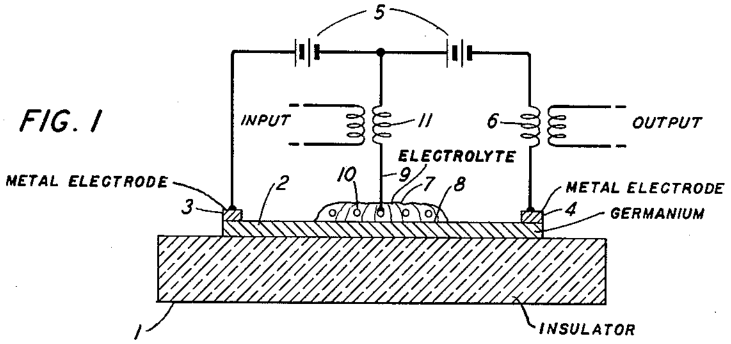
Fig. 1 is a schematic diagram of apparatus embodying the principles of the invention.

Referring now to Fig. 1 a supporting base 1 of insulating material, for example a ceramic or polystyrene, is provided, as by evaporation or the like, with a layer or strip 2 of semiconductive material on one surface. This may be silicon, germanium, selenium or the like. Two electrodes 3, 4, spaced apart by a substantial length of the semiconductor strip, make contact with it. They are interconnected by way of a potential source 5 and a work circuit here symbolically illustrated as an output transformer 6. When these connections are made, a current flows through the semi-conductor strip 2 which is limited in large part by the resistance of the strip.

An electrolyte 7, preferably a liquid electrolyte, is placed in direct physical, mechanical and electrical contact with the surface 8 of the semiconductor strip 2, and electric connection is made to the electrolyte by way of a conductor 9 which is embedded in it and which may bear a spiral or rectangular grid 10 for the purpose of equalizing the potentials throughout the electrolyte. The conductor 9 which makes contact with the electrolyte is returned to a suitable point of the external work circuit, for example the midpoint of the potential source 5, by way of a suitable input circuit which is symbolically indicated as an input transformer 11.

The electrolyte may be of any desired type subject to the restrictions that it does not react chemically either with the semiconductor material 2 or with the material of the input conductor 9 or the grid 10, and that its ionic discharge potential (i. e., decomposition potential) with respect to the material of the semiconductor is not too low. With silicon, germanium or selenium as the semiconductor and with any inert metal, such as silver, as the input conductor, water meets all of these requirements. Its decomposition potential is known to be of the order of 2 volts or slightly less. Therefore the potential difference between the input conductor 9 and the semiconductor strip 2 may be as high as about 2 volts either positive or negative before serious discharge current flows across the interface 8 between the electrolyte 7 and the semiconductor 2. With these restrictions an input signal of any magnitude from 0 to about 2 volts produces at the interface 8 between the electrolyte and the semiconductor an electric field which is so strong as to overpower surface charges which are bound to the surface of the semiconductor and to reach into the interior of the semiconductor strip and modify its conductivity. As a result, the current in the external work circuit and in the output transformer is modified. In one particular example, utilizing a layer of germanium of $5 \times 10^{-5}$ cm. thickness and of P-type conductivity, and glycol borate as the electrolyte, a potential change of 2 volts on the input conductor 9 resulted in a change in electric field at the surface of the germanium of $4 \times 10^{7}$ volts per cm., resulting in a current change through the layer of $10^{-4}$ amperes. The load resistance was 1,000 ohms to match the end-to-end resistance of the layer between the electrodes 3 and 4, so the useful power output was $10 \times 10^{-6}$ watts. The input power was $1 \times 10^{-6}$ watts giving a power gain factor of 10.

Figure 2:
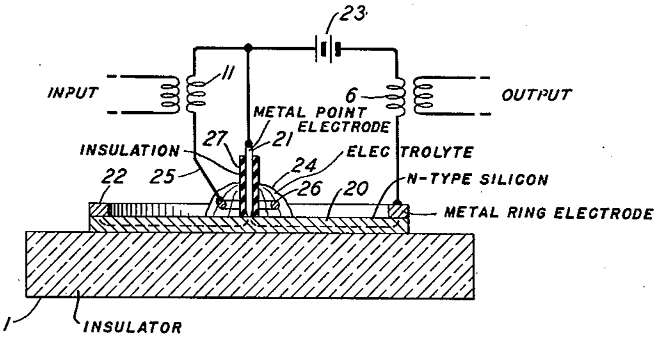
Fig. 2 is an alternative to Fig. 1 showing a preferred electrode arrangement.

Fig. 2 shows an alternative electrode arrangement which serves to minimize parasitic capacities and at the same time to increase the control action. With this arrangement, which forms a part of the subject-matter of an application of John Bardeen, Serial No. 11,166, filed February 26, 1948, the semiconductor layer 20 may have the approximate form of a disc, one of the electrodes of the external circuit being a point electrode 21 which makes contact with the layer 20 over an area which is small as compared with the layer surface although large as compared with the layer thickness. In the figures, the thickness of the semiconductor layer is greatly exaggerated. The other electrode 22 makes contact with the layer 20 over an approximate circle surrounding the first electrode. With this arrangement, current entering the semiconductor layer 20 from the point electrode 21 under the action of the potential source 23 spreads laterally in all directions away from the point electrode 21 before being collected by the ring electrode 22. Therefore, the major part of the resistance of the semiconductor layer 20 lies in a region immediately surrounding the point electrode 21. This region, therefore, is a preferred location at which to exert the influence of the control electrode which, in accordance with the present invention, may be a drop 24 of electrolyte. As in the case of Fig. 1, contact may be made with the electrolyte by a conductor 25 which extends into the drop being terminated in a loop 26 of wire of inert metal such as silver. The point electrode 21 is covered by a coating 27 of insulating material such as wax in order to insulate it from the electrolyte 24. An input signal applied to the electrolyte 24, for example by way of an input transformer 11, results in the application to the semiconductor layer 20 in the immediate vicinity of the point electrode 21 of a very strong electrostatic field which reaches past the surface charges which may be bound on the surface of the layer 20 and into its interior, and modifies the density in that neighborhood of the mobile charges and therefore the resistance of the external circuit as a whole. This resistance modification appears as an alteration of the current in the transformer 6 and so as a signal-controlled voltage across it.

Figure 3:
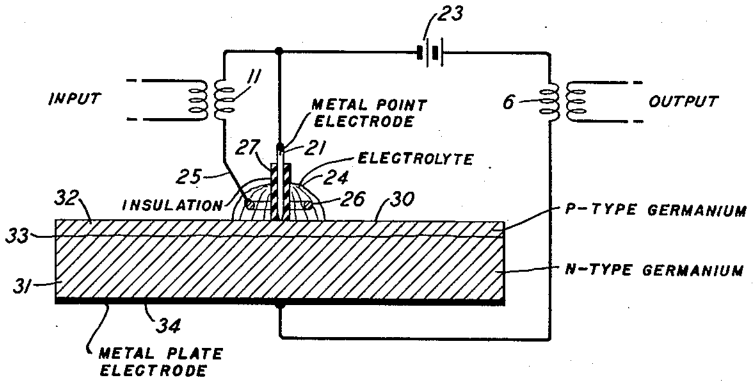
Fig. 3 is another alternative to Fig. 1, illustrating the application of the invention to a block of germanium having one conductivity characteristic in its body and an opposite conductivity characteristic throughout a thin surface layer.

Fig. 3 shows a third embodiment of the invention in which the point electrode 21, the electrolyte control electrode 24, the input transformer 11 and the output transformer 6 may be identical with those of Fig. 2. In place of a supporting base of insulating material as in Fig. 1 and Fig. 2, the base and the semiconductive layer of Fig. 3 are of the same chemical material. For example, the base may be a block 31 of germanium of N-type conductivity having on one surface thereof a thin layer 32 of P-type conductivity separated from the body of the block by a high resistance barrier 33, or the base may be of P-type silicon having at one surface thereof a thin layer of N-type silicon, separated from the body of the block by a high resistance barrier. The external work circuit is connected from the point electrode 21 and by way of a potential source 23 and a load, for example an output transformer 6, to the main body of the block 31 where connection may be made by soldering or otherwise to a plate or film 34 of metal which has been applied by evaporation or like process to the body of the block 31. The potential source 23 is so poled, in accordance with known techniques, as to cause the resistance of the barrier 33 to be high. Thus, when the surface layer 32 is of P-type conductivity as shown, the negative terminal of the source 23 is connected to the point electrode 21 and its positive terminal is connected to the film 34. With an N-type surface layer on a P-type body, the polarity of the source 23 is to be reversed. Because of the comparatively high resistance of the barrier 33 as compared with the lateral resistance of the surface layer 32, the work circuit current, after entering the layer 32 from the point electrode 21, first spreads laterally before turning to cross the high resistance barrier 33. In the immediate vicinity of the point electrode 21 therefore, nearly all of the current flows in a lateral direction, that is, parallel with the surface instead of normally to it. Therefore the control may be exercised by the application of a signal to the drop of electrolyte 24 in the same way as in the case of Fig. 2.

Various other electrode geometries and selections of materials will occur to those skilled in the art. The heart of the invention is the application of a controlling field to the surface of a layer of semiconductor material by way of an electrolyte, which may be in direct mechanical, physical and electrical contact therewith.

What is claimed is:

1. A circuit element which comprises a layer of semiconductive material, means for passing a current longitudinally within said layer, an electrolyte in contact with a face of said layer, and connections for applying an electric signal to said electrolyte, whereby an electric field is applied in a direction normal to the direction of current flow within said layer and of a character to modify the resistance of said layer to said longitudinal current.

2. A circuit element which comprises a layer of semiconductive material, a work circuit including a potential source and a load interconnecting separated parts of said layer, an electrolyte in contact with a face of said layer, and means including said electrolyte for applying an electrostatic field to said layer face, whereby the conductivity of said layer to current flowing within it between said parts is modified.

3. A circuit element which comprises a layer of semiconductive material, a first electrode and a second electrode in contact with said layer, a work circuit including a potential source and a load impedance interconnecting said electrodes, an electrolyte in contact with a face of said layer and external to said work circuit, and means including said electrolyte for applying an electrostatic field to said layer face, whereby the conductivity of said layer between said electrodes is modified.

4. Apparatus as defined in claim 3 wherein the first electrode is a point electrode.

5. Apparatus as defined in claim 3 wherein the first electrode is a point electrode and wherein the electrolyte is disposed in close proximity to said point electrode.

6. Apparatus as defined in claim 3 wherein the first electrode is a point electrode and wherein the electrolyte surrounds said point electrode.

7. Apparatus as defined in claim 3 wherein the second electrode surrounds the first electrode.

8. Apparatus as defined in claim 3 wherein the electrolyte surrounds the first electrode and wherein the second electrode surrounds the electrolyte.

9. Apparatus as defined in claim 3 wherein the first electrode is a point electrode, wherein the electrolyte surrounds the point electrode, and wherein the second electrode surrounds the electrolyte.

10. A circuit element which comprises a supporting body, a thin layer of semiconductive material supported on said body, and differing in conductivity therefrom, two electrodes in contact with said layer, a work circuit including a potential source and a load impedance interconnecting said electrodes, an electrolyte in contact with said layer and external to said work circuit, a source of signals, and means including said signal source for applying a voltage to said electrolyte to produce an electrostatic field at the surface of said semiconductive layer, whereby the resistance of said layer between said first two electrodes is modified.

11. Apparatus as defined in claim 10 wherein the supporting body is of insulating material.

12. Apparatus as defined in claim 10 wherein the supporting body is a block of semiconductive material of one conductivity type and wherein the layer is of the same material but of opposite conductivity type.

13. Apparatus as defined in claim 10 wherein the supporting body is a block of semiconductive material of one conductivity type and wherein the layer is of opposite conductivity type and is separated from the body of the block by a high resistance barrier.

14. Signal translating apparatus which comprises a semiconductive body, a first electrode making contact with said body at one part thereof, a second electrode making contact with said body at another part thereof, a work circuit including a potential source, a load, said electrodes and a part of said body intermediate said electrodes, the disposition of said electrodes and the characteristics of said body being such that current of said source flows within said body parallel with and close to a face thereof, an electrolyte in contact with said face and external to said work circuit, a signal source, a control circuit for applying the voltage of the signals of said source to said electrolyte, in magnitude less than the decomposition voltage of said electrolyte, thereby to apply to said face of said body an electric field of intensity sufficient to modify the internal resistance of said body to the current flowing within it parallel and close to said face.

WALTER H. BRATTAIN.
ROBERT B. GIBNEY.

REFERENCES CITED

The following references are of record in the file of this patent:

UNITED STATES PATENTS

| Number | Name | Date |
|---|---|---|
| 1,745,175 | Lilienfeld | Jan. 28, 1930 |
| 1,900,018 | Lilienfeld | Mar. 7, 1933 |

FOREIGN PATENTS

| Number | Country | Date |
|---|---|---|
| 349,584 | Great Britain | May 21, 1931 |
| 439,457 | Great Britain | Dec. 6, 1935 |